United States Patent [19]

Miyahara et al.

[11] 4,406,157
[45] Sep. 27, 1983

[54] FEEDBACK METHOD AND APPARATUS FOR TESTING THE INTERNAL PRESSURE OF A SEALED CONTAINER

[75] Inventors: Nagao Miyahara, Kiyose; Sadaaki Kikuchi, Kasukabe, both of Japan

[73] Assignees: Nikka Densoku Ltd.; Hokkai Can Co., Ltd., both of Tokyo, Japan

[21] Appl. No.: 277,601

[22] Filed: Jun. 26, 1981

[30] Foreign Application Priority Data

Jun. 27, 1980 [JP] Japan .................................. 55-87541

[51] Int. Cl.³ ........................ G01M 3/24; G01L 11/00
[52] U.S. Cl. .......................................... 73/52; 73/702; 73/579
[58] Field of Search .................... 73/52, 702, 703, 579

[56] References Cited

U.S. PATENT DOCUMENTS

| | | | |
|---|---|---|---|
| 2,675,698 | 4/1954 | Johnson | 73/579 |
| 2,895,094 | 7/1959 | Seiler | 73/579 X |
| 3,802,252 | 4/1974 | Hayward et al. | 73/52 |
| 4,117,731 | 10/1978 | Heyman | 73/579 |
| 4,187,718 | 2/1980 | Shibasaki | 73/52 |
| 4,212,205 | 7/1980 | West et al. | 73/52 X |
| 4,223,790 | 9/1980 | Yoshida | 73/52 X |

FOREIGN PATENT DOCUMENTS 2029018  3/1980  United Kingdom ................. 73/579

OTHER PUBLICATIONS

Krautkramer, "Ultrasonic Testing of Materials" 2nd. Ed., 1979, pp. 275-278.

Primary Examiner—E. R. Kazenske
Assistant Examiner—Tom Noland
Attorney, Agent, or Firm—Fleit, Jacobson & Cohn

[57] ABSTRACT

A method of and an apparatus for testing the internal pressure of a sealed container carried on a conveyor belt by striking the container with an electromagnetic pulse thereby causing its wall to vibrate, and to check the internal pressure of the sealed container based upon the frequency of the vibratory sound produced by the sealed container. The vibratory sound is converted to an electrical signal by an electroacoustic transducer and is returned to a container striking device in a feedback path thereby to strike repetitively the sealed container with the same frequency of the vibratory sound. The repetitive striking produces continuously without damping a vibratory sound at a frequency commensurate with the natural frequency of vibration of the container. The testing of the internal pressure of the sealed container can be carried out in a stable manner with increased accuracy. A reject system is responsive to the vibratory frequency to permit passage of or to remove the container from the conveyor belt.

3 Claims, 9 Drawing Figures (A)

PRIOR ART (B)

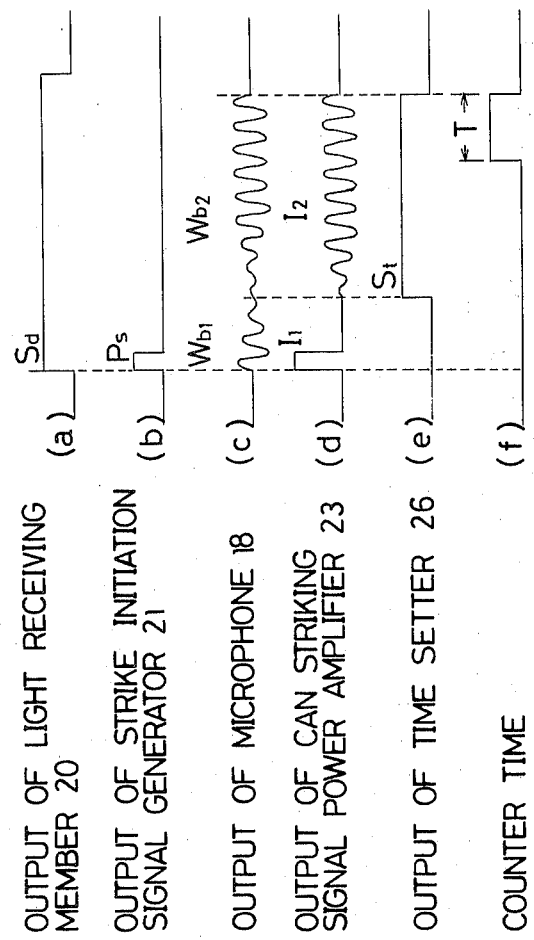

FEEDBACK METHOD AND APPARATUS FOR TESTING THE INTERNAL PRESSURE OF A SEALED CONTAINER

BACKGROUND OF THE INVENTION

This invention relates to improvements in or relating to a method of and an apparatus for the nondestructive testing the internal pressure of sealed containers for canned goods, sealed containers for canned refreshments, widemouthed sealed bottles having metal caps, etc.

When a force of impact is applied to the wall of a sealed container, natural vibration is generated by the oscillation system unless the wall of the sealed container is nonresilient. Such natural vibration is closely related to the internal pressure of the vessel, although it may vary depending on the shape and material of the vessel to a certain extent. Proposals have already been made to carry out nondestructive testing of sealed containers based on this principle to determine whether or not the internal pressure of the sealed vessels is at an acceptable level.

Some disadvantages are associated with a method of the prior art for determining the level of the internal pressure of a sealed container by applying a force of impact thereto. The present practice is to apply a single pulse to the wall of a sealed container to obtain a response. Generally, the response made by the wall of a sealed container to the force of impact applied thereto tends to be reduced in energy with time. Thus difficulties have hitherto been experienced, when the method of the prior art of using a single pulse is relied on, in obtaining satisfactory results of tests because of the relatively short period of time during which the vibration to be measured exists.

SUMMARY OF THE INVENTION

This invention has been developed for the purpose of obviating the aforesaid disadvantage of the prior art. The invention has as its object the provision of a method of and an apparatus for testing the internal pressure of a sealed container capable of carrying out tests with a high degree of accuracy and obtaining satisfactory results.

The outstanding characteristic of the invention is that, in place of applying a single pulse-like force of impact to the wall of a sealed container, the vibration produced in the wall of a sealed container is returned in feedback to means for applying a force of impact to the wall so that the wall of the sealed container may be struck continuously with a signal commensurate with the sound of vibration.

In this way, the container is caused to produce vibratory sound which continues over a prolonged period without showing a reduction in energy, to enable testing to be performed in a stable manner to obtain satisfactory results. The method according to the invention offers the advantage that even if the application of a force of impact to the wall of a sealed container produces incidental vibration or abnormal vibration, such vibrations do not continue to exist and it is only the vibratory sound which is the fundamental vibration natural to the sealed container that is led to the impact applying source and continues its existence. The method of the prior art has suffered the disadvantage that when the liquid level or the level of the contents of the sealed container shows a variation or the bottom of the sealed container in contact with a conveyor belt, wobbles while the container is being conveyed by the conveyor belt, vibration is greatly reduced in energy, with the result that it is impossible to carry out tests by the method of the prior art. The method according to the invention is capable of obviating this disadvantage when such phenomenon occurs by continuously applying a force of impact to the sealed container. Thus the invention can achieve the effect of increasing the accuracy of the results of tests even if tests are conducted after the containers are packed in a cardboard box.

BRIEF DESCRIPTION OF THE DRAWINGS

FIG. 5 is a time chart showing the operation of the testing apparatus shown in FIG. 4.

DESCRIPTION OF THE PREFERRED EMBODIMENT

Figure 1:
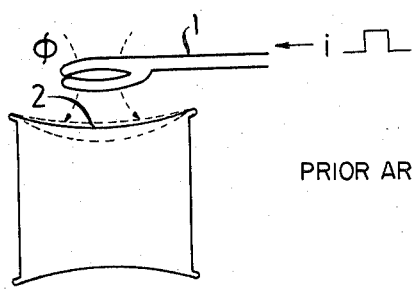
FIG. 1 is a view in explanation of the principle of applying a force of impact to a sealed container.
Figure 2:
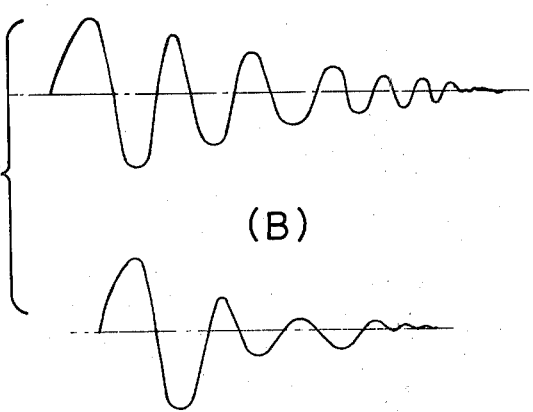
FIGS. 2(A) and 2(B) show examples of the sound produced by applying a force of impact to a sealed container in the prior art.

Referring to FIG. 1, an electric hammer coil 1 generates a magnetic flux $\phi$ when a rectangular wave pulse current is passed thereto, and the magnetic flux $\phi$ electromagnetically acts on a lid 2 of a can made of metal to cause the lid 2 to vibrate and produce sound. Analysis of the vibratory sound produced by the lid 2 determines whether or not the internal pressure of the can is acceptable. The vibration of the lid 2 is damped vibration as can be seen in FIGS. 2(A) and 2(B). Thus there is no guarantee that satisfactory results can be obtained at all times by the method of the prior art in which the tests relies on a single force of impact applied to the sealed container to be tested.

For example, when the vibratory sound continues to exists only for a short period (due to rapid damping) as shown in FIG. 2(B), difficulties would be encountered in analyzing the vibration. This might cause the results of analysis to become unstable and make the result of tests inaccurate. When the vibratory sound continuously exists for a considerably prolonged period of time as shown in FIG. 2(A), accurate results will be obtained if tests were carried out as soon as the vibratory sound is produced. However, if tests are carried out after the containers are put in a cardboard box, for example, the sound produced would become small because of the presence of a sound absorbing material between the lid of the can that produces noise by vibration and means for testing the vibratory sound of the lid of the can. Thus the results of tests would be no more accurate than the results of tests conducted by using the vibratory sound shown in FIG. 2(B).

Figure 3:
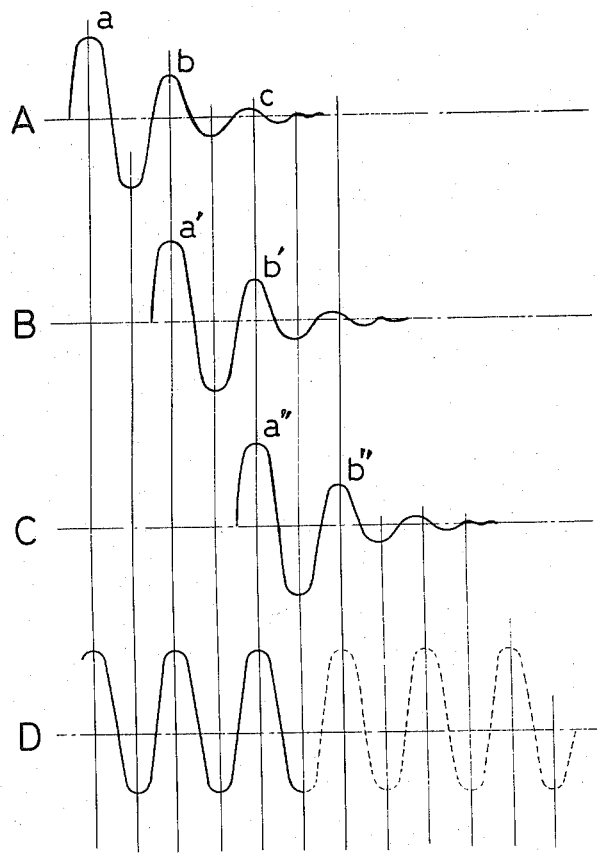
FIGS. 3A-3D are views in explanation of the principle of the method according to the invention.

FIGS. 3A-3D are views in explanation of the principles of the method according to the invention in which a force of impact may be applied electromagnetically by using an electric hammer coil disposed above the lid of a sealed container to which is passed a rectangular wave pulse current. FIG. 3A shows a sound wave form produced by electromagnetic application of impact in which waves a, b and c show a gradual reduction in amplitude. The sound of this wave form is sensed by an electro-acoustic transducer, amplified by an amplifier and fed to the electric hammer coil starting with the wave b at which the second cycle sets in. That is, a pulse current passed to the electric hammer coil for an instant to electromagnetically cause the lid of the container to produce vibratory sound is returned in feedback to the electric hammer coil in synchronism with the vibration of the lid of the container, to thereby cause the lid of the container to produce a sound of a fresh wave form as shown in FIG. 3B. The sound is sensed by the electroacoustic transducer again and amplified by the amplifier. The amplified sound is returned to the electric hammer coil beginning with the wave b' at which the second cycle sets in, to thereby produce a sound of the wave form shown in FIG. 3C. This process is repeated until the lid of the container produces a continuous sound wave form as shown in FIG. 3D. In the invention, the sealed container is tested for its internal pressure based on the frequency of the sound of the continuous wave form produced by continuous application of a force of impact to the sealed container. The test can be carried out in a stable manner, and the result produced is high in accuracy.

Figure 4:
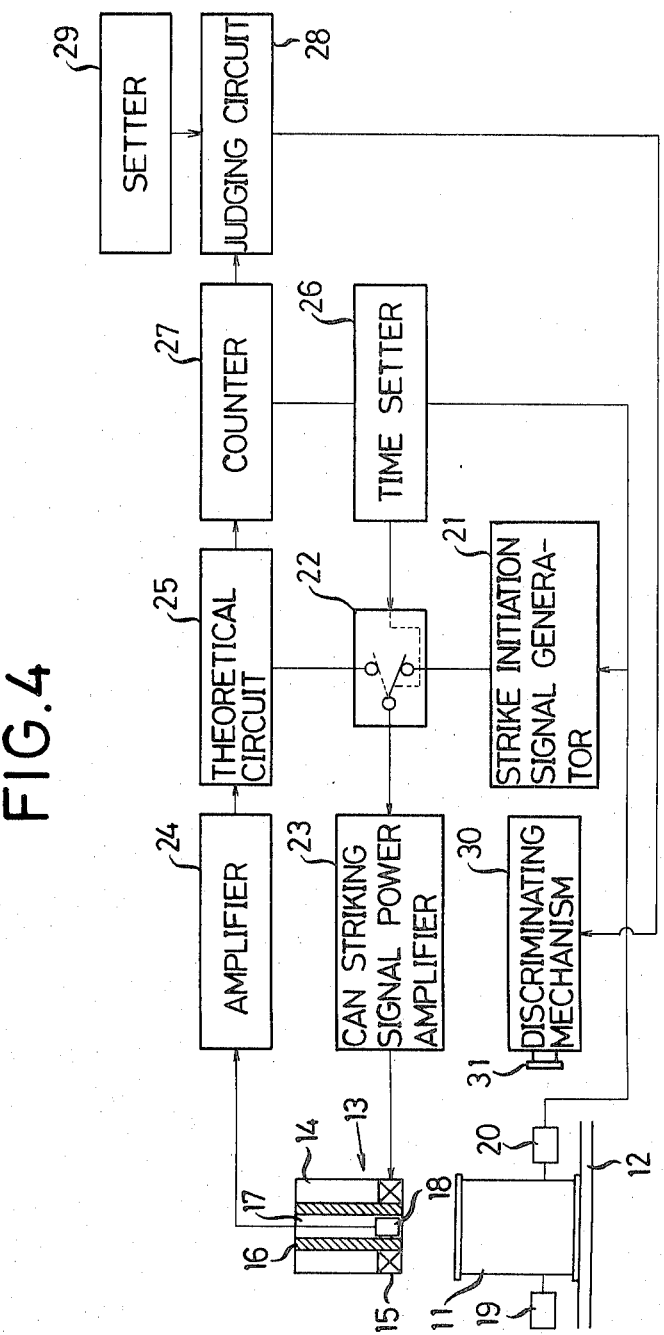
FIG. 4 is a block diagram of the testing apparatus comprising one embodiment of the invention.

FIG. 4 shows one embodiment of the testing apparatus in conformity with the invention which comprises a testing section 13 located above a belt conveyor 12 for conveying a can 11 containing canned goods. The can 11 is moved in a direction perpendicular to the plane of FIG. 4 to pass below the testing section 13.

The testing section 13 comprises an electromagnetic coil 15 fitted in a lower portion of a cylindrical member 14 formed in a resin to serve as an electric hammer coil, a split cylindrical magnetic core 16 arranged in the resinous cylindrical member 14, and a microphone 18 fitted in a sound collecting opening 17 from above the magnetic core 16 to serve as an electroacoustic transducer. The magnetic core 16 performs the function of protecting the microphone 18 from the electromagnetic waves produced in the electromagnetic coil 15 and bundling the magnetic flux to obtain concentration of an electromagnetic force. Sensing means comprising a light source 19 and a light receiving member 20 is located beneath the testing section 13, with the light source 19 and the light receiving member 20 being disposed on opposite sides of the belt conveyor 12 on which the can is conveyed.

As the can 11 moves below the testing section 13, the light emanating from the light source 19 is blocked by the can 11 to enable the sensing means to sense the presence of the can 11. Thus the light receiving member 20 generates a sensing signal Sd as shown at (a) in FIG. 5 during the time the light from the light source 19 is prevented from being incident thereon. The sensing signal Sd is transmitted to a strike initiation signal generator 21 and a time setter 26. The rise of the sensing signal Sd triggers the strike initiation signal generator 21 to cause the latter to generate a rectangular wave pulse serving as a strike initiation signal Ps as shown at (b) in FIG. 5. Meanwhile the rise of the sensing signal Sd sets the time setter 26 to cause the latter to begin counting time. The strike initiation signal Ps from the stroke initiation signal generator 21 is passed through a switch 22 and amplified at a can striking signal power amplifier 23, so that a pulse current $I_1$ serving as a strike initiation signal as shown at (d) in FIG. 5 is generated. The pulse current $I_1$ is then supplied to the electromagnetic coil 15 which electromagnetically strikes the lid of the can 11 once. The application of a force to the lid of the can 11 causes the wall of the can 11 to vibrate, to thereby produce sound. The sound is converted by the microphone 18 into an electric signal Wb1 as shown at (c) in FIG. 5 which is supplied to an amplifier 24 which amplifies the signal Wb1 and transmits the amplified signal to a theoretical circuit 25 where the phase delay of the signal is adjusted before the signal is supplied to the switch 22.

The time setter 26 produces an output St as shown at (e) in FIG. 5 after lapse of a timer time set at a value at least greater than the pulse duration of the strike initiation signal Ps. Prior to the production of the output St by the time setter 26, the switch 22 connects the strike initiation signal generator 21 with the can striking signal power amplifier 23 while keeping the theoretical circuit 25 disconnected with the can striking signal power amplifier 23, until the strike initiation signal Ps ceases to exist (for a predetermined time which the time setter 26 sets). However, upon the time setter 26 producing the output St, the switch 22 disconnects the strike initiation signal generator 21 with the can striking signal power amplifier 23 and connects the theoretical circuit 25 with the can striking signal power amplifier 23. Thus the electric signal Wb1 produced by converting the strike initiation signal Ps is returned in feedback to the can striking signal power amplifier 23, where the signal Ps is amplified before being supplied to the electromagnetic coil 15 in the form of an AC current $I_2$ as shown at (d) in FIG. 5. At this time, the AC current $I_2$ for driving the electromagnetic coil 15 has had its phase already adjusted to avoid vibration of the can wall being damped by the action of the theoretical circuit 15, so that the vibration of the can wall gradually increases and the sound also increases in intensity. This is attributed to the formation of an oscillating system with the can serving as an oscillator because the microphone 18, amplifier 24, theoretical circuit 25, switch 22, can striking signal power amplifier 23, electromagnetic coil 15 (for striking the can) and microphone 18 constitute a closed loop. Thus an electric signal Wb2 representing the sound produced by the can 11 continuously exists as shown at (c) in FIG. 5 while the can 11 is located beneath the testing section 13.

The signal produced by the theoretical circuit 25 is used as a can striking signal $I_2$ of the alternating wave form as aforesaid and at the same time supplied to a counter 27 which starts to count the waves of the alternating wave form supplied from the theoretical circuit 25 when an output is produced in a second output terminal of the time setter 26 following lapse of a second period of time set by the time setter 26 and continues to count the waves until the time setter 26 is reset when the output Sd of the sensor 20 disappears. A time T shown at (f) in FIG. 5 indicates the time during which the counter 27 counts the waves as aforesaid.

The counter 27 produces a counter output corresponding to the frequency of the vibratory sound of the can 11 which is supplied to a judging circuit 28 where it is compared with an output of a setter 29 for setting a reference value based on which the internal pressure of the can 11 is judged. In the event that the result of the comparison indicates that the internal pressure of the can 11 is unacceptable or the difference between the counter output and the reference value set by the setter 29 exceeds an allowable value, the judging circuit 28 produces a signal which actuates a discriminating mechanism 30. That is the discriminating mechanism 30 comprise a removing member 31 which is actuated upon production of the output signal from the judging circuit 28, to remove the can 11 of unacceptable internal pressure from the conveyor belt 12.

The magnetic core 16 of the testing section 13 performs the function of protecting the microphone 18 from the magnetic wave produced in the magnetic coil 15 when a pulse current $I_1$ or an alternating current $I_2$ is passed thereto and bundling the magnetic flux to obtain concentration of the electromagnetic force, to thereby increase the intensity of vibration of the can wall. In addition, the provision of the magnetic core 16 can achieve the effect of suppressing incident vibration and abnormal vibration and producing fundamental vibration which is associated with the internal pressure of the can by striking the central portion of the can.

What is claimed is:

1. An apparatus for testing the internal pressure of a sealed container comprising:

container striking means for striking a wall of the sealed container with an electromagnetic pulse to cause same to vibrate and produce vibratory sound;

an electroacoustic transducer means for converting the vibratory sound produced by the wall of the sealed container into an electric signal;

a judging circuit for judging the internal pressure of the sealed container based on the frequency of the electric signal supplied from the electroacoustic transducer;

a strike initiation signal generator producing a strike initiation signal for striking the wall of the sealed container;

a theoretical circuit for producing as its output a signal obtained by adjusting the phase of the electric signal produced by the electroacoustic transducer;

a switch for supplying the output of the theoretical circuit in place of the output of the strike initiation signal generator to the container striking means prior to disappearance of the vibration of the wall of the sealed container following generation of the strike initiation signal; and an amplifier amplifying the output of the switch and supplying same to the container striking means.

2. An apparatus as claimed in claim 1, wherein the sealed container is conveyed by a conveyor belt to a testing station in a series of sealed containers to be tested one after another.

3. An apparatus as claimed in claim 2, further comprising a discriminating mechanism for removing from the conveyor belt an unacceptable sealed container based on an output signal of the judging circuit.

* * * * *